United States Patent
Li et al.

(10) Patent No.: US 8,504,207 B2
(45) Date of Patent: Aug. 6, 2013

(54) ELECTRONIC DEVICE AND METHOD FOR CONTROLLING MOTIONS OF MECHANICAL ARM USING THE ELECTRONIC DEVICE

(75) Inventors: Shen-Chun Li, Tu-Cheng (TW);
Hsien-Chuan Liang, Tu-Cheng (TW);
Shou-Kuo Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 295 days.

(21) Appl. No.: 13/028,160

(22) Filed: Feb. 15, 2011

(65) Prior Publication Data
US 2012/0041598 A1 Feb. 16, 2012

(30) Foreign Application Priority Data

Aug. 11, 2010 (TW) .............................. 99126704 A

(51) Int. Cl.
*G05B 13/00* (2006.01)
(52) U.S. Cl.
USPC ............................... 700/275; 175/24; 378/38
(58) Field of Classification Search
USPC ............................... 700/275; 175/24; 378/38
See application file for complete search history.

(56) References Cited

U.S. PATENT DOCUMENTS

| | | | |
|---|---|---|---|
| 2003/0208302 A1* | 11/2003 | Lemelson et al. | 700/245 |
| 2004/0054441 A1* | 3/2004 | Stamps et al. | 700/275 |
| 2006/0067464 A1* | 3/2006 | Clinthorne et al. | 378/38 |
| 2009/0095526 A1* | 4/2009 | Lane et al. | 175/24 |

* cited by examiner

*Primary Examiner* — Mohammad Ali
*Assistant Examiner* — Anthony Whittington
(74) *Attorney, Agent, or Firm* — Altis Law Group, Inc.

(57) ABSTRACT

A method controls motions of a mechanical arm using an electronic device. The mechanical arm includes an x-axis, a y-axis, and a z-axis. The method sets a step angle of a motor installed in line with the z-axis, and predefines angles of rotation as reference points regarding orientation of the rotating arm when rotated. The method further calculates a rotation angle of the rotating arm in a polar coordinate system, calculates coordinate motions of the x-axis and the y-axis if a free end of the rotating arm orientates to one of the reference points, and calculates an offset correction value of a pole origin position of the polar coordinate system. After correcting each of the coordinate motions and the pole origin position, the method controls the mechanical arm to move, and drives the rotating arm to reach another reference point according to a multiple of the step angle.

13 Claims, 5 Drawing Sheets

US 8,504,207 B2

ELECTRONIC DEVICE AND METHOD FOR CONTROLLING MOTIONS OF MECHANICAL ARM USING THE ELECTRONIC DEVICE

BACKGROUND

1. Technical Field

The disclosure relates to motion control devices and methods, and more particularly to an electronic device for controlling motions of a mechanical arm and method using the electronic device.

2. Description of Related Art

Mechanical arms are frequently used in an industrial setting and are controlled by computer numerical control machine. The mechanical arm may include three principal axes of control: an x-axis, a y-axis, and a z-axis. The three principal axes are linear (i.e. they move in a straight line rather than rotate) and are at right angles to each other. Because of the linear principal axes, the mechanical arm has a limited range of motion for controlling an end-effecter attached to the arm. Generally the end-effecter cannot rotate a large range, such as 360 degrees or more than 360 degrees. This limitation causes, for example, inaccuracy in controlling the end-effecter, such as a probe, to measure a workpiece. Therefore, there is room for improvement within the art.

DETAILED DESCRIPTION

In general, the word "module," as used herein, refers to logic embodied in hardware or firmware, or to a collection of software instructions, written in a program language. In an exemplary embodiment, the program language may be Java or C. One or more software instructions in the modules may be embedded in firmware, such as an EPROM. The modules described herein may be implemented as either software and/or hardware modules and may be stored in any type of non-transitory computer-readable medium or other non-transitory storage device.

Figure 1:
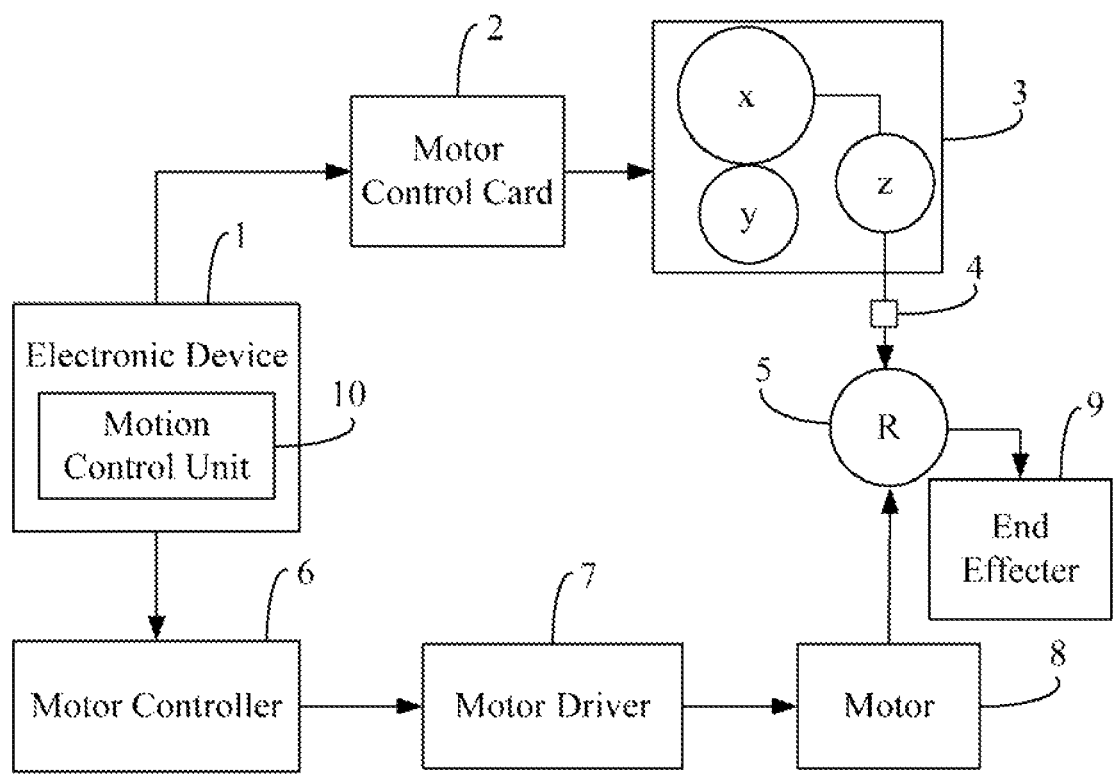
FIG. 1 is a block diagram of an exemplary embodiment of an electronic device comprising a motion control unit.

FIG. 1 is a block diagram of an exemplary embodiment of an electronic device 1. In the exemplary embodiment, the electronic device 1 can be a host computer, and includes a motion control unit 10. The motion control unit 10 is programmed to control motions of a mechanical arm 3 via a motor control card 2. The mechanical arm 3 includes three principal axes of control: an x-axis, a y-axis, and a z-axis. The three principal axes are linear (i.e. they move in a straight line rather than rotate) and are at right angles to each other. In an exemplary embodiment, arm movement along each of the three principal axes is by its own dedicated motor (not illustrated in FIG. 1). The motion control unit 10 controls motions of the three principal axes by controlling the motors connected to each of the three principal axes.

In an exemplary embodiment, a rotating arm 5 has a fixed end EE1 and a free end EE2, the fixed end EE1 connects to one of the three principal axes (such as the z-axis) via a connector 4. In one example, as illustrated in FIG. 1, the free end EE2 is attached to an end effecter 9, such as a probe.

Figure 4:
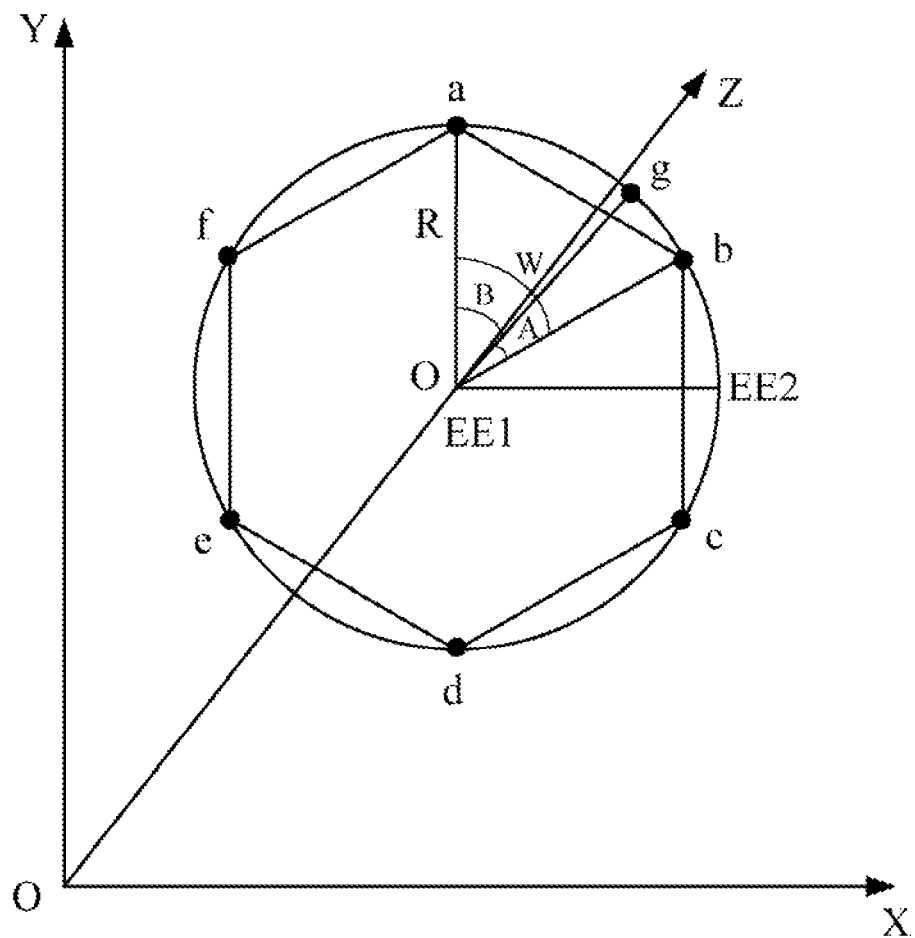
FIG. 4 is a schematic diagram illustrating one example for rotating an end effecter in a polar coordinate system.

The computer 1 is further connected to a motor controller 6. In an exemplary embodiment, the motor controller 6 may be used for converting pulse signals from the computer 1 into binary signals, and controlling a motor driver 7 to drive a motor 8 according to the binary signals. The motor 8 is installed in line with the z-axis, but is not one of the previously mentioned motors used to control the three principal axes. In the exemplary embodiment, an axis of the motor 8 is connected to the rotating arm 5. The motor 8 drives the rotating arm 5 to manipulate the end effecter 9, to execute a predetermined action, such as taking a measurement. A graph of the path of the rotating arm 5 moving through 360 degrees of rotation, is illustrated in FIG. 4. As can be seen by the path, the axis of rotation allows for manipulating the end effecter 9, such as a probe connected to the end effecter 9, to measure predetermined points of a workpiece with a single engagement regardless of the number of turns needed.

In an exemplary embodiment, the motor 8 can be a servo motor or a step motor with the corresponding motor driver 7. The motor controller 6 is a digital input/output controller. In the exemplary embodiment, the motor 8 is the servo motor, and the motor driver 7 is the servo motor driver.

Figure 2:
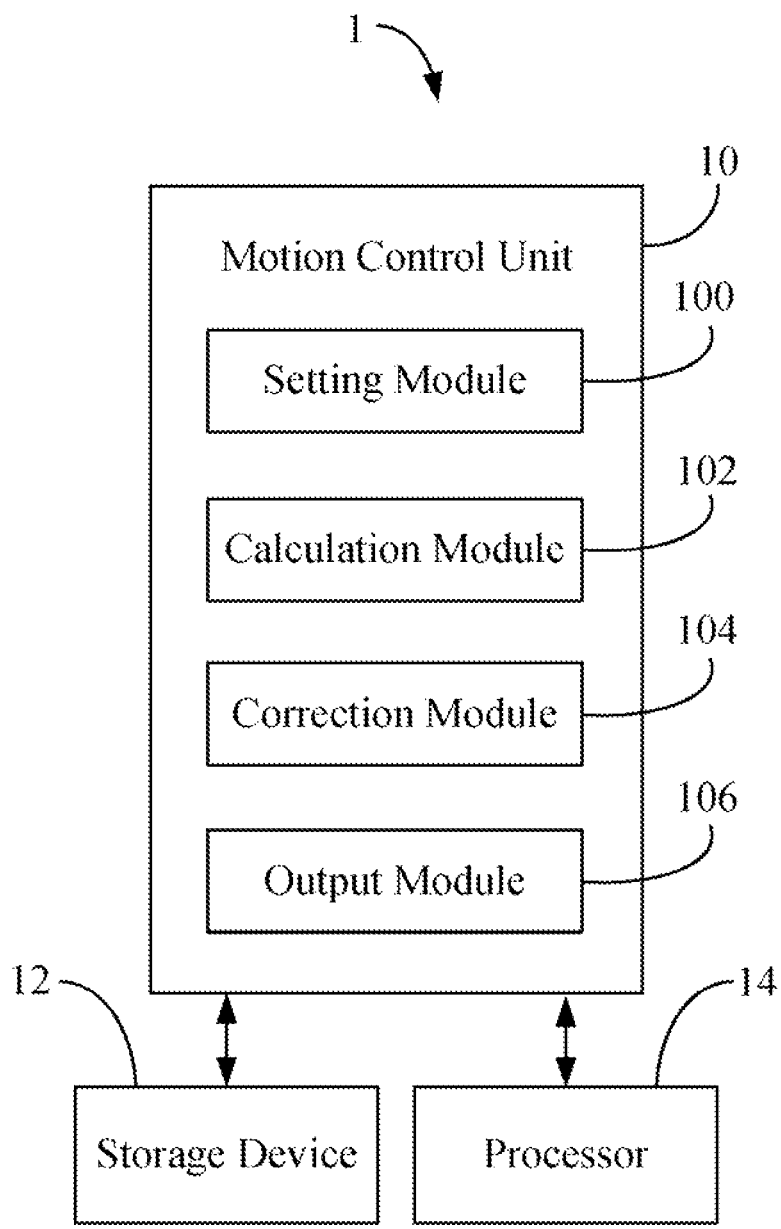
FIG. 2 is a block diagram of function modules of the motion control unit of FIG. 1.

FIG. 2 is a block diagram of function modules of the motion control unit 10 of FIG. 1. In an exemplary embodiment, the motion control unit 10 may include a setting module 100, a calculation module 102, a correction module 104, and an output module 106. Each of the modules 100-106 may be a software program including one or more computerized instructions that are stored in a storage device 12 and executed by one or more processors 14. The storage device 12 is a non-transitory computer-readable storage medium, such as CD, DVD, flash memory, and hard disk drives.

The setting module 100 is operable to set motion control parameters, and predefine angles of rotation as reference points regarding orientation of the rotating arm 5 when rotated. In the exemplary embodiment, the motion control parameters include a step angle of the motor 8, in other words the angle of rotation the motor 8 turns when taking a single step, a step number of the motor 8, in other words how many steps must the motor 8 take to rotate the rotating arm 5 360 degrees, and a length of the rotating arm 5 (shown as the radius R in FIG. 4 and FIG. 5). The reference points include at least two target points, such as a first target point (a point O in FIG. 4 and FIG. 5) and a second target point (a point g in FIG. 4 and FIG. 5) for locating the ends EE1 and EE2 respectively.

In the exemplary embodiment, the step angle is a rotation angle of the motor 8 taking a single step when the motor 8 receives a corresponding current pulse signal. For example, if the motor 8 must take two-hundred steps to rotate 360 degrees, then the step angle of the motor 8 can be calculated as: 360/200=1.8 degrees.

Upon the condition that the rotating arm 5 rotates and the fixed end EE1 of the rotating arm 5 is orientated to the first target point (see the point O in FIG. 4), the first target point can be defined as a pole origin position of a polar coordinate system, and an oz-axis can be defined as a pole axis of the polar coordinate system. If the rotating arm 5 rotates and the free end EE2 of the rotating arm 5 orientates to the second target point (such as the point g), the rotation angle of the rotating arm 5 can be calculated by the calculation module 102. In the exemplary embodiment, the calculated rotation angle is a theoretical value, and the free end EE2 of the rotating arm 5 may not be able to actually reach the second target point.

In detail, continuing with the example illustrated in FIG. 4, the x-axis and the y-axis can be controlled to move if the fixed end of the rotating arm 5 must be moved to orientate the fixed end at the first target point. Due to coordinate values of the points O' and O, the coordinate motions of the x-axis and the y-axis can be calculated, and the rotation angle of the rotating arm 5 also can be calculated.

For example, as illustrated in FIG. 4, the length of the rotating arm 5 is R, the motor 8 can rotate W degrees when taking N steps, points a and b are reference points regarding orientation of the rotating arm 5 when rotated. With more steps the motor 8 can rotate the rotating arm 5 to the points c, d, e and f. However, the rotating arm 5 may not be able to accurately rotate to the second target point g because the motor 8 can only control the rotating arm 5 to rotate a number of degrees that is a multiple of the step angle.

To enhance motion control accuracy, the pole origin position in the polar coordinate system can be corrected. Before correcting the pole origin position, the calculation module 102 calculates an offset correction value of the pole origin position according to the calculated rotation angle and the coordinate motions. Details of calculating the offset correction value are described below and illustrated in FIG. 5.

Figure 5:
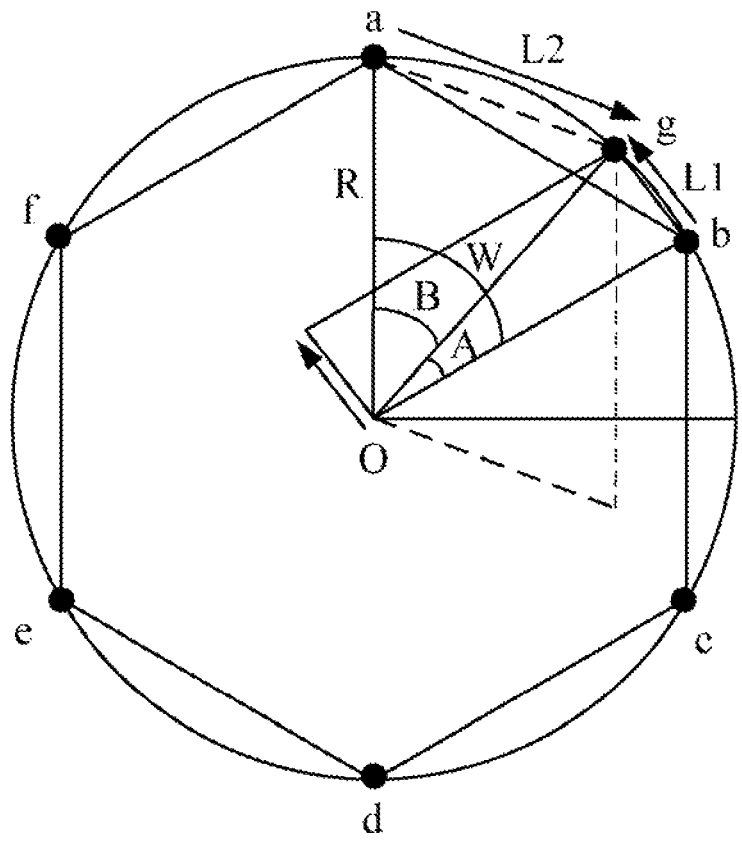
FIG. 5 is a schematic diagram illustrating one example for calculating an offset correction value.

As illustrated in FIG. 5, the length of the rotating arm 5 is R, the rotating arm 5 can rotate to the points a, b, c, d, e and f, and the point g is a position that the rotating arm 5 would rotate to in ideal condition. In FIG. 5, the polar angle "aOg" equals B degrees, which is a theoretical value. The polar angle "bOg" equals A degrees, the polar angle "aOb" equals W degrees, and the step number of the motor 8 is "i" if the free end EE2 of the rotating arm 5 rotates to the point b. So that the coordinate value of the point a in the X-Y plane is $(R[\cos((i+1)w)], R[\sin((i+1)w)])$, the coordinate value of the point g in the X-Y plane is $(R[\cos(A+iW)], R[\sin(A+iW)])$ or $(R[\cos((i+1)W-B)], R[\sin((i+1)W-B)])$, the coordinate value of the point b is $(R[\cos(iW)], R[\sin(iW)])$.

The calculation module 102 calculates a vector of the line L1 as: $\{R(\cos(iW))-R(\cos(A+iW)), R(\sin(iW))-R(\sin(A+iW))\}$, and calculates a vector of the line L2 as: $\{R(\cos(iW))-R[\cos((i+1)W-B], R(\sin(iW))-R[\sin((i+1)W-B)]\}$. Each of the vectors of the lines L1 and L2 can be considered as the offset correction value of the pole origin position. For example, if the step angle of the motor 8 is 1.8 degrees, to rotate the rotating arm 5 to the second target point (such as the point g, the calculated rotation angle is 17.8 degrees), the motor 8 can control the rotating arm 5 to rotate 18 degrees or 16.2 degrees, which are multiples of the step angle. If the rotating arm 5 rotates 18 degrees to the second target point g, the offset correction value of the pole origin position equals the vector of the line L1. If the rotating arm 5 rotates 16.2 degrees to the second target point g, the offset correction value of the pole origin position equals the vector of the line L2.

The correction module 104 corrects the pole origin position of the polar coordinate system, and corrects each of the coordinate motions using the offset correction value.

The output module 106 outputs the motion control parameters to the mechanical arm 3, controls the mechanical arm 3 to move according to the corrected coordinate motions, generates pulse signals according to the multiple of the step angle (i.e., 16.2 degrees or 18 degrees), and outputs the pulse signals to the motor controller 6. The motor controller 6 converts the pulse signals into a binary signal, and transmits the binary signal to the motor driver 7. The motor driver 7 drives the motor 8 for controlling the rotating arm 5 to rotate according to the binary signal.

In coordination with the rotation of the rotating arm 5, the end effecter 9 can execute a predetermined action such as taking a measurement.

Figure 3:
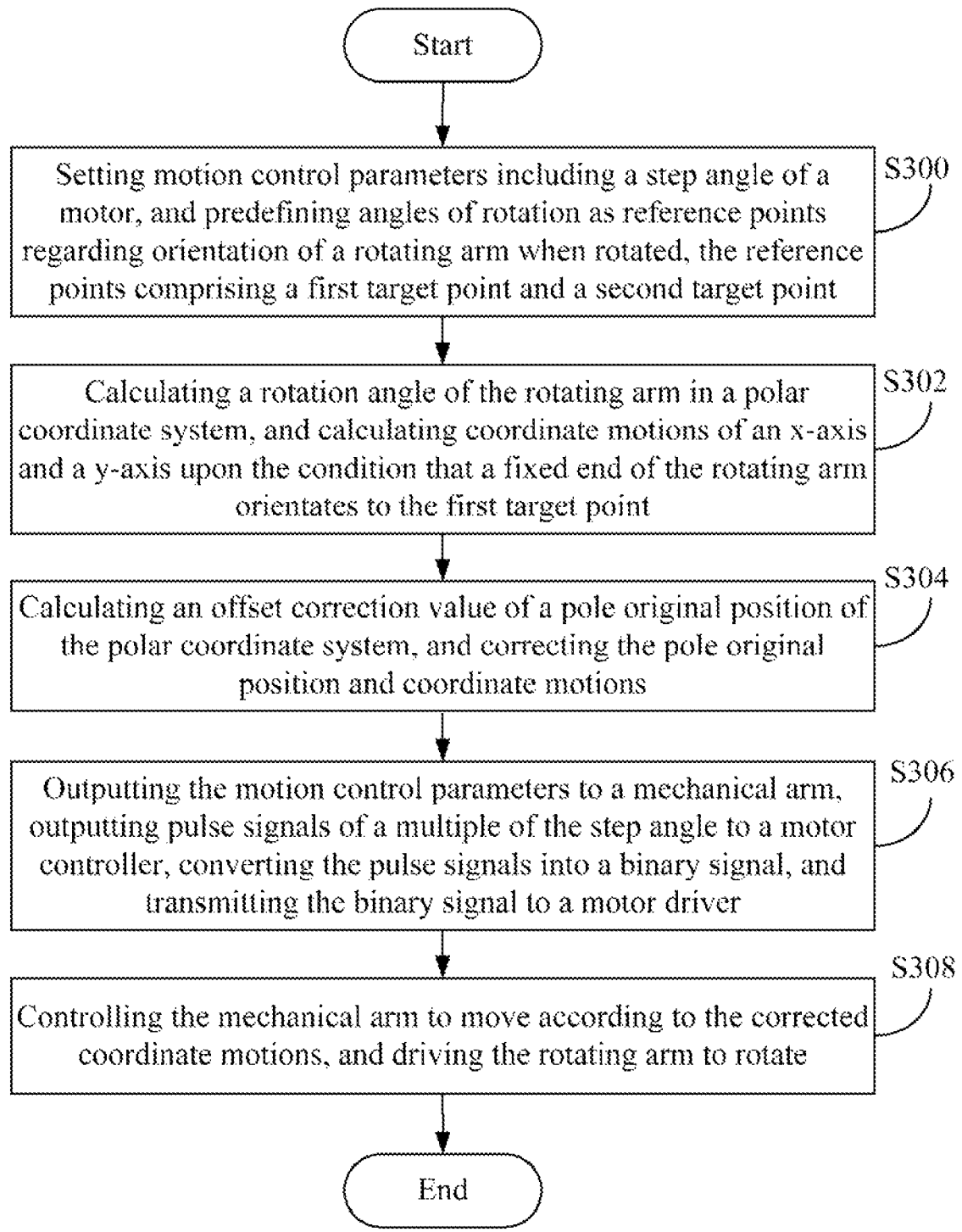
FIG. 3 is a flowchart illustrating an exemplary embodiment of a method of controlling motions of a mechanical arm that is connected to the electronic device.

FIG. 3 is a flowchart illustrating an exemplary embodiment of a method of controlling motions of the mechanical arm 3 that is connected to the computer 1. Depending on the exemplary embodiment, additional blocks may be added, others removed, and the ordering of the blocks may be changed.

In block S300, the setting module 100 sets motion control parameters, and predefines angles of rotation as reference points regarding orientation of the rotating arm 5 when rotated. In the exemplary embodiment, the motion control parameters include a step angle of the motor 8, a step number of the motor 8, and a length of the rotating arm 5. The reference points include at least two target points, such as a first target point (the point O in FIG. 4 and FIG. 5) and a second target point (the point g in FIG. 4 and FIG. 5).

In block S302, the calculation module 102 calculates a rotation angle of the rotating arm 5 in a polar coordinate system, and calculates coordinate motions of the x-axis and the y-axis upon the condition that a fixed end EE1 of the rotating arm 5 orientates to the first target point (see the point O in FIG. 4), and a free end of the rotating arm 5 should be oriented to the second target point (see the point g in FIG. 4). In the polar coordinate system, the pole axis is the oz-axis, and the pole origin position is the first target point.

Actually, in the block S302, the free end EE2 of the rotating arm 5 may not be able to rotate to the second target point because the motor 8 can only control the rotating arm 5 to rotate to a degree that is a multiple of the step angle. to control the free end EE2 of the rotating arm 5 to actually reach the second target point, the pole origin position in the polar coordinate system is corrected in following step.

In block S304, the calculation module 102 calculates an offset correction value of the pole origin position of the polar coordinate system according to the calculated rotation angle, the step angle of the motor 8, and the coordinate motions. Details of calculating the offset correction value have been previously described. The correction module 104 corrects the pole origin position and each of the coordinate motions using the offset correction value.

In block S306, the output module 106 outputs the motion control parameters to the mechanical arm 3, generates pulse signals according to a multiple of the step angle, and outputs the pulse signals to the motor controller 6. The motor controller 6 converts the pulse signals into a binary signal, and transmits the binary signal to the motor driver 7.

In block S308, the mechanical arm 3 moves according to the corrected coordinate motions, and the motor driver 7 drives the motor 8 for controlling the rotating arm 5 to rotate according to the binary signal. Upon the rotating arm 5 rotates, the end effecter 9 can execute a predetermined action such as taking a measurement, for example.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for controlling motions of a mechanical arm using an electronic device, the mechanical arm comprising an x-axis, a y-axis, and a z-axis, the method comprising:

setting motion control parameters comprising a step angle of a motor installed in line with the z-axis, and predefining angles of rotation as reference points regarding orientation of a rotating arm when rotated;

calculating a rotation angle of the rotating arm in a polar coordinate system, and calculating coordinate motions of the x-axis and the y-axis controlled to move a fixed end of the rotating arm to one of the reference points according to the motion control parameters;

calculating an offset correction value of a pole origin position of the polar coordinate system according to the rotation angle, the step angle of the motor, and the coordinate motions;

correcting the pole origin position and each of the coordinate motions using the offset correction value;

controlling the mechanical arm to move according to the corrected coordinate motions; and driving the rotating arm to reach another reference point according to a multiple of the step angle, wherein the driving step comprises:

generating pulse signals according to the multiple of the step angle;

outputting the pulse signals to a motor controller that is connected to the electronic device;

converting the pulse signals into a binary signal by the motor controller, and transmitting the binary signal to a motor driver for driving the motor; and driving the rotating arm to rotate by the motor.

2. The method as described in claim 1, wherein the fixed end of the rotating arm is connected to the z-axis, and the free end of the rotating arm is attached with an end effecter, and the end effecter executes a predetermined action when the rotating arm rotates.

3. The method as described in claim 1, wherein the reference points comprising a first target point as the pole origin position of the polar coordinate system when the fixed end of the rotating arm orientates to the first target point, and a second target point as the point that the free end of the rotating arm orientates to.

4. The method as described in claim 1, wherein the motion control parameters further comprise a step number of the motor and a length of the rotating arm.

5. An electronic device for controlling a mechanical arm, the mechanical arm comprising an x-axis, a y-axis, and a z-axis, the electronic device comprising:

at least one processor;

a storage device; and one or more programs stored in the storage device and executed by the at least one processor, the one or more programs comprising:

a setting module that sets motion control parameters comprising a step angle of a motor installed in line with the z-axis, and predefines angles of rotation as reference points regarding orientation of a rotating arm when rotated;

a calculation module that calculates a rotation angle of the rotating arm in a polar coordinate system, calculates coordinate motions of the x-axis and the y-axis controlled to move a fixed end of the rotating arm to one of the reference points according to the motion control parameters, and calculates an offset correction value of a pole origin position of the polar coordinate system according to the rotation angle, the step angle of the motor, and the coordinate motions;

a correction module that corrects the pole origin position of the polar coordinate system, and corrects each of the coordinate motions using the offset correction value;

an output module that controls the mechanical arm to move according to the corrected coordinate motions, and drives the rotating arm to reach another reference point according to a multiple of the step angle;

wherein the electronic device is further connected to a motor controller that receives the pulse signals, converts the pulse signals into a binary signal, and transmits the binary signal to a motor driver for driving the motor.

6. The electronic device as described in claim 5, wherein the fixed end of the rotating arm is connected to the z-axis, and the free end of the rotating arm is attached with an end effecter, and the end effecter executes a predetermined action when the rotating arm rotates.

7. The electronic device as described in claim 5, wherein the reference points comprise a first target point as the pole axis of the polar coordinate system when a fixed end of the rotating arm orientates to the first target point, and a second target point as the point that the free end of the rotating arm orientates to.

8. The electronic device as described in claim 5, wherein the motor is a servo motor or a step motor.

9. The electronic device as described in claim 5, wherein the motion control parameters further comprise a step number of the motor and a length of the rotating arm.

10. A non-transitory computer-readable storage medium having stored thereon instructions that, when executed by a processor of an electronic device, cause the processor to implement a method for controlling motions of a mechanical arm, the mechanical arm comprising an x-axis, a y-axis, and a z-axis, the method comprising:

setting motion control parameters comprising a step angle of a motor installed in line with the z-axis, and predefining angles of rotation as reference points regarding orientation of a rotating arm when rotated;

calculating a rotation angle of the rotating arm in a polar coordinate system, and calculating coordinate motions of the x-axis and the y-axis controlled to move a fixed end of the rotating arm to one of the reference points according to the motion control parameters;

calculating an offset correction value of a pole origin position of the polar coordinate system according to the rotation angle, the step angle of the motor, and the coordinate motions;

correcting the pole origin position and each of the coordinate motions using the offset correction value;

controlling the mechanical arm to move according to the corrected coordinate motions; and driving the rotating arm to reach another reference point according to a multiple of the step angle, wherein the driving step comprises:

generating pulse signals according to the multiple of the step angle;

outputting the pulse signals to a motor controller that is connected to the electronic device;

converting the pulse signals into a binary signal by the motor controller, and transmitting the binary signal to a motor driver for driving the motor; and driving the end effecter to rotate by the motor.

11. The non-transitory computer-readable storage medium as described in claim 10, wherein the fixed end of the rotating arm is connected to the z-axis, and the free end of the rotating arm is attached with an end effecter, and the end effecter executes a predetermined action when the rotating arm rotates.

12. The non-transitory computer-readable storage medium as described in claim 10, wherein the reference points comprising a first target point as the pole origin position of the polar coordinate system when the fixed end of the end effector orientates to the first target point, and a second target point as the point that the free end of the end effector orientates to.

13. The non-transitory computer-readable storage medium as described in claim 10, wherein the motor is a servo motor or a step motor.

* * * * *